(Model.)
D. STRUNK.
GRAIN BINDER.
No. 269,347. Patented Dec. 19, 1882.
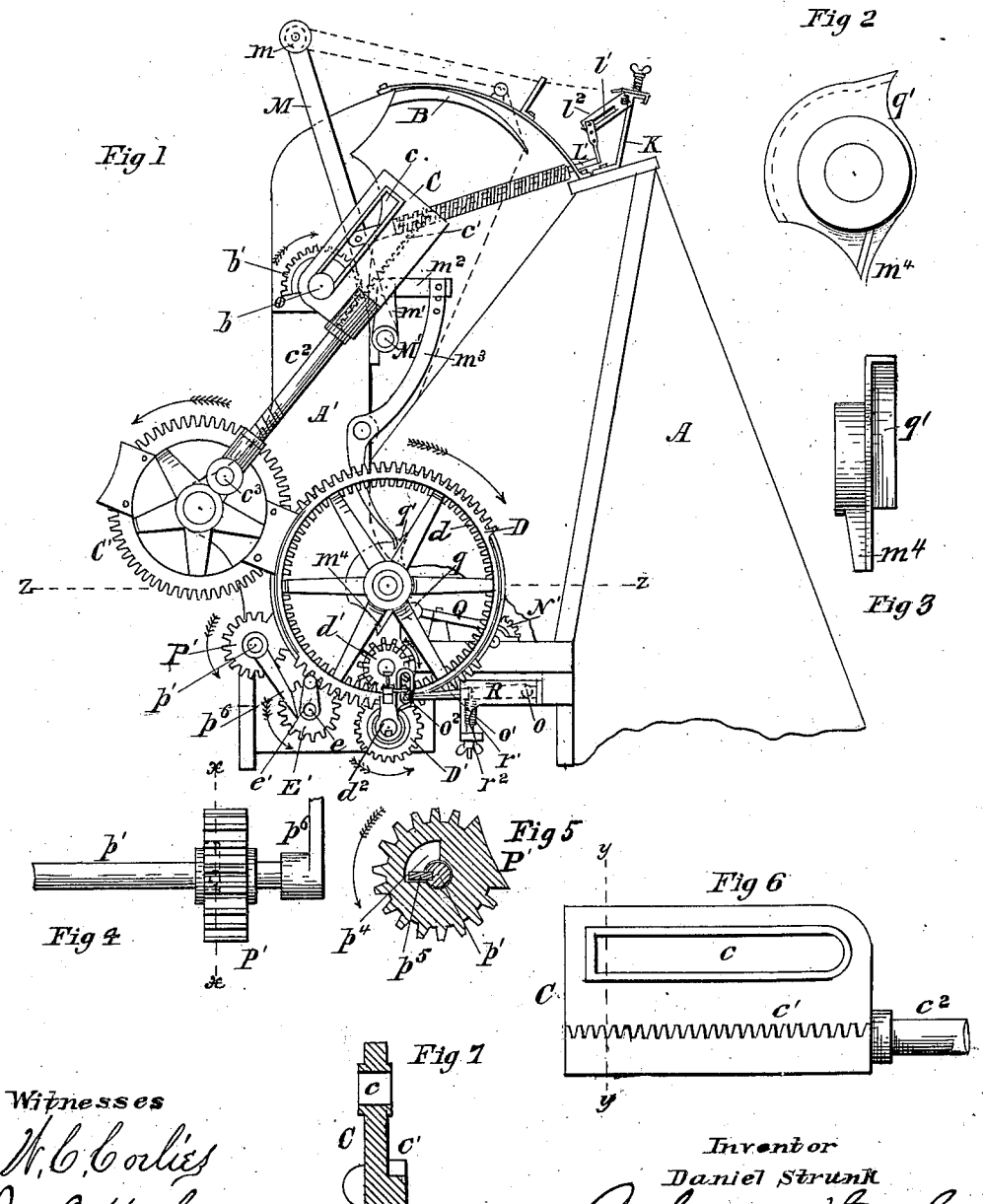
Witnesses
W. C. Coliés
Jno. C. MacGregor.
Inventor
Daniel Strunk
By Coburn & Thacher
Attorneys (Model.)
D. STRUNK.
GRAIN BINDER.
No. 269,347. Patented Dec. 19, 1882.
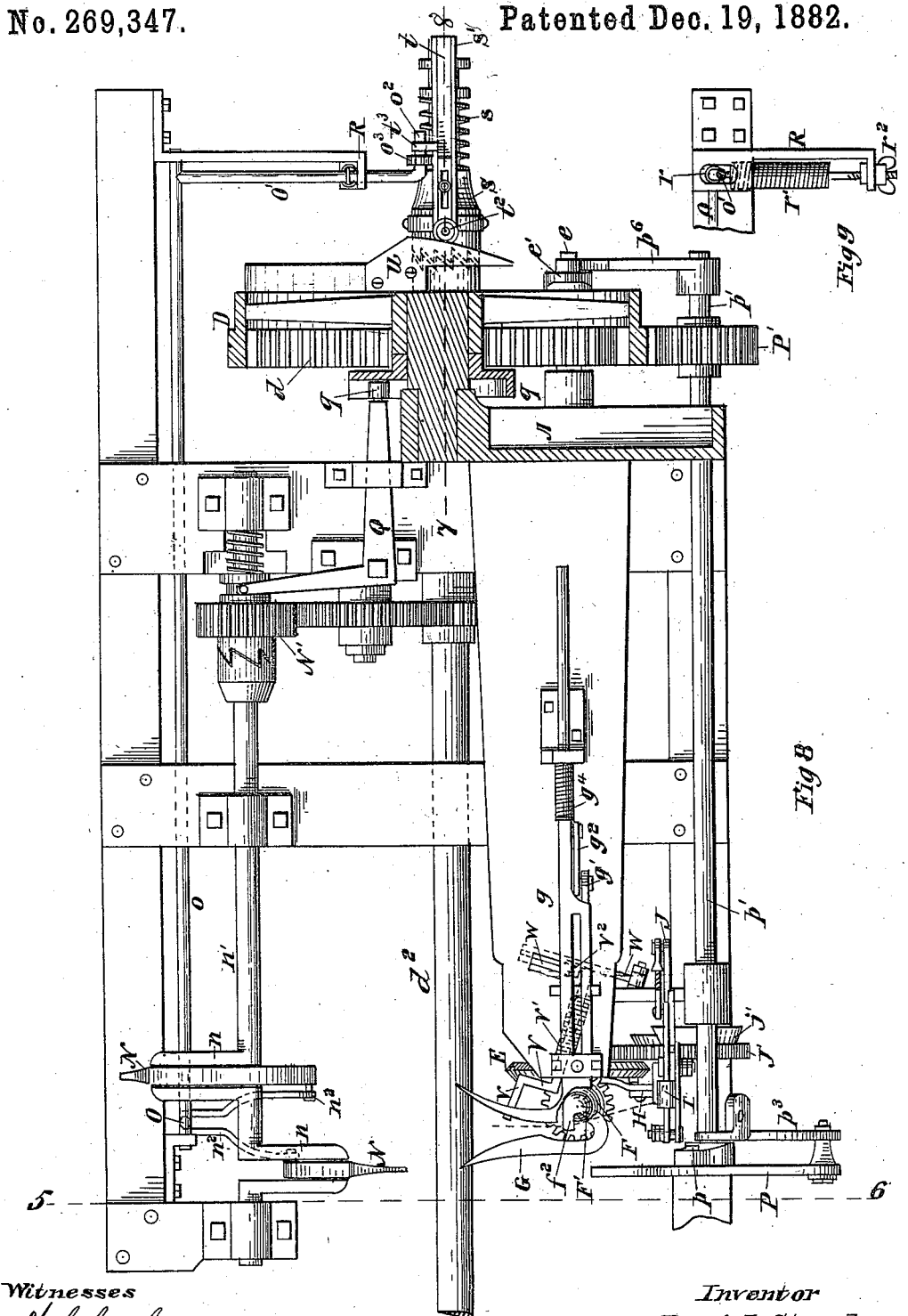
Witnesses
Inventor
Daniel Strunk (Model.)
D. STRUNK.
GRAIN BINDER.
No. 269,347.
5 Sheets—Sheet 3.
Patented Dec. 19, 1882.
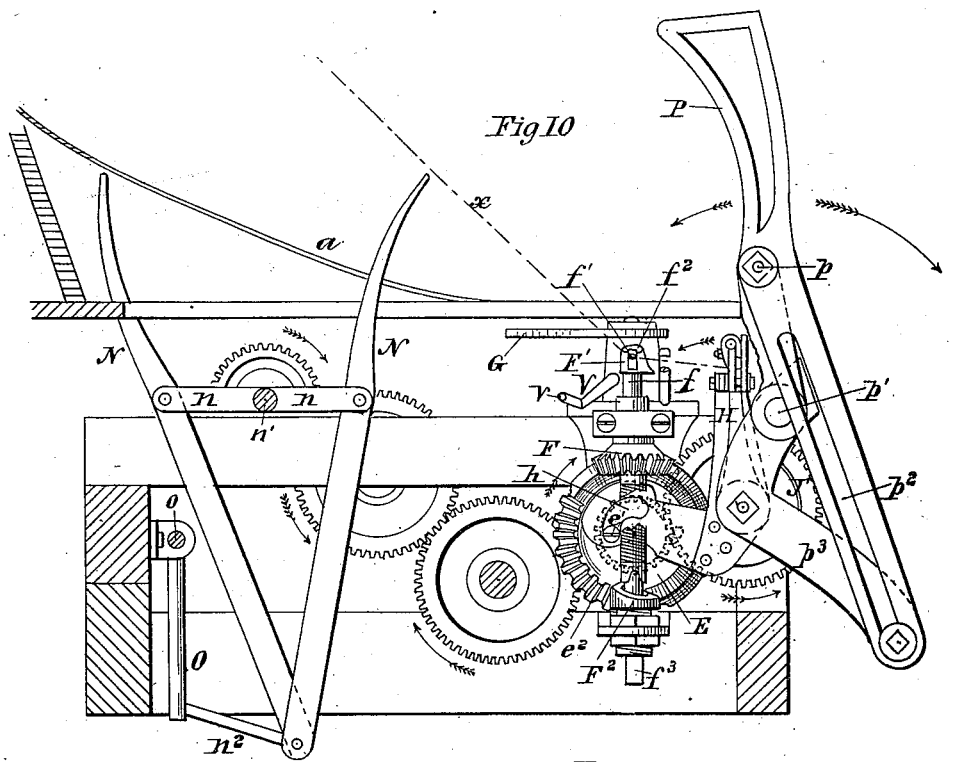
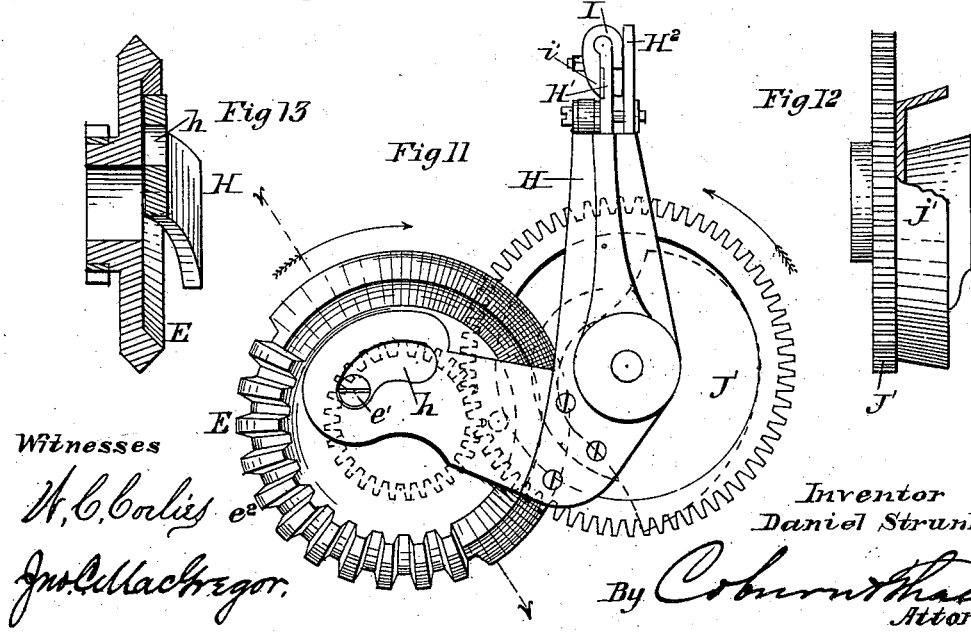
Witnesses
Inventor
Daniel Strunk
By Coburn & Thacher
Attorneys

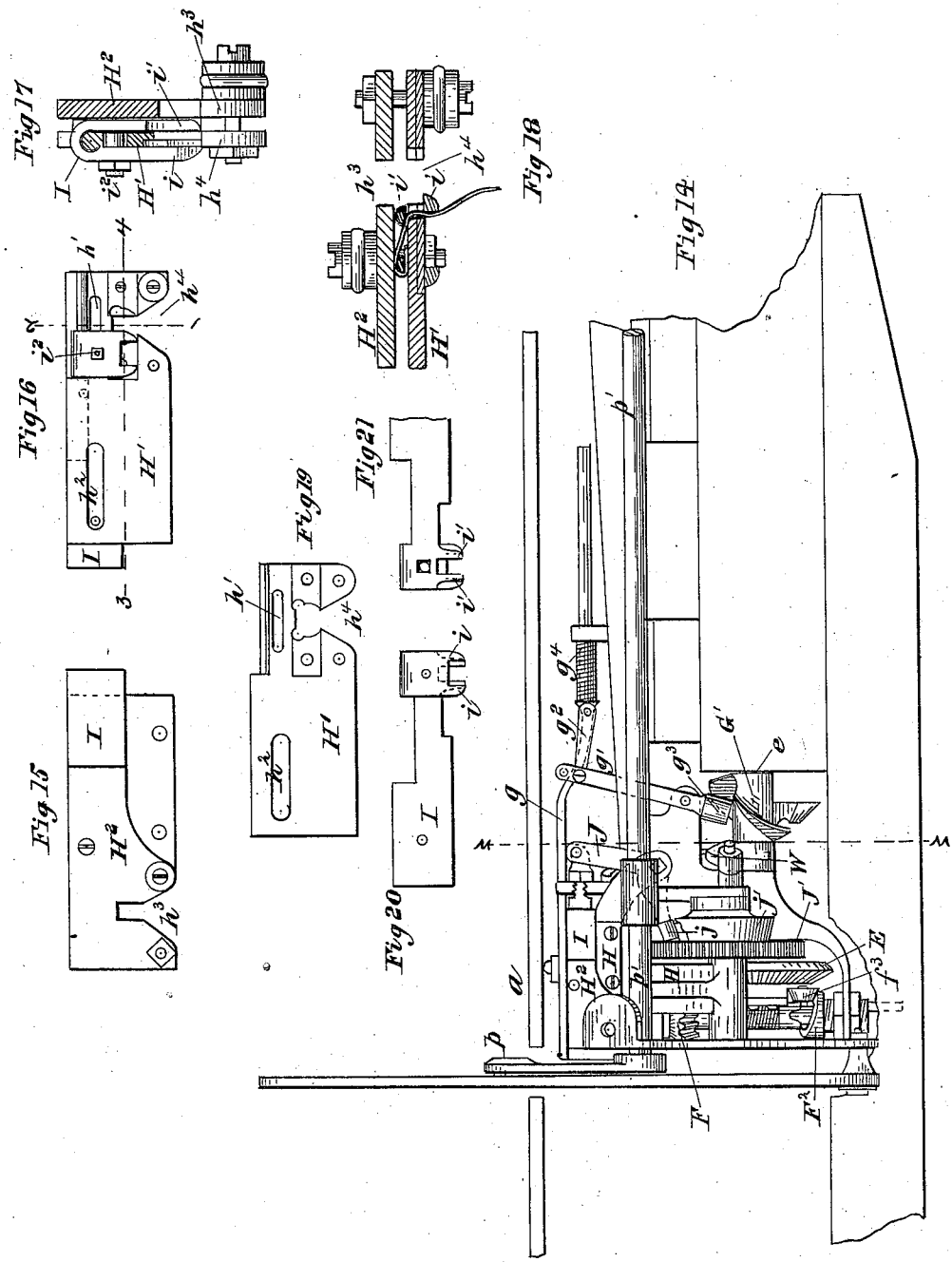

(Model.)
D. STRUNK.
GRAIN BINDER.
No. 269,347.  Patented Dec. 19, 1882.
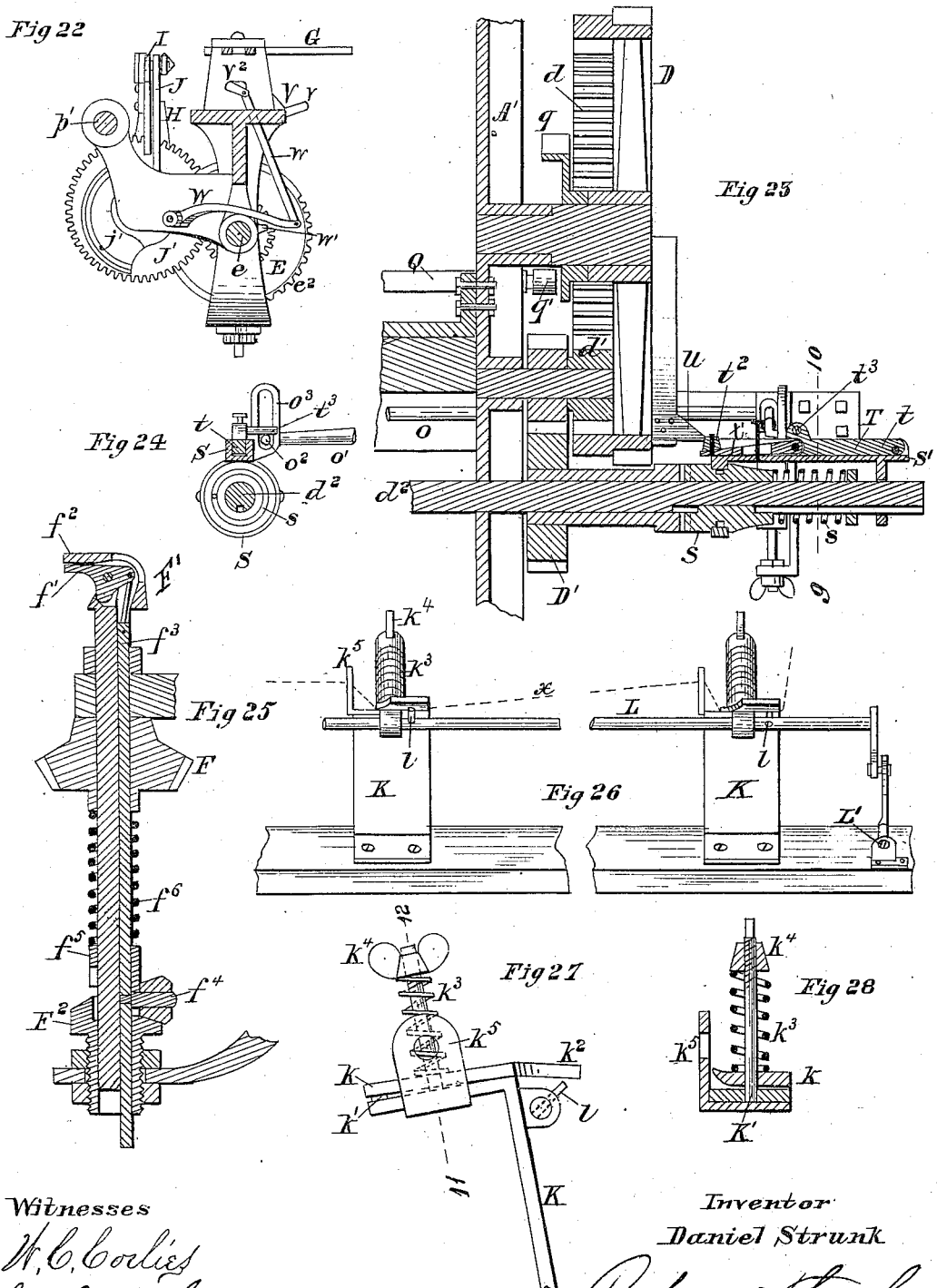
Witnesses
W. C. Corlies
Jno. C. MacGregor
Inventor
Daniel Strunk
By Coburn & Thacher
Attorneys

UNITED STATES PATENT OFFICE.

DANIEL STRUNK, OF JANESVILLE, WISCONSIN, ASSIGNOR TO THE MINNEAPOLIS HARVESTER WORKS, OF MINNESOTA.

GRAIN-BINDER.

SPECIFICATION forming part of Letters Patent No. 269,347, dated December 19, 1882.

Application filed July 7, 1881. (Model.)

*To all whom it may concern:*

Be it known that I, DANIEL STRUNK, a citizen of the United States, residing at Janesville, in the county of Rock and State of Wisconsin, have invented certain new and useful Improvements in Grain-Binders, fully set forth in the following specification, reference being had to the accompanying drawings, in which—

Figure 1 represents a front end elevation of the binder and a portion of the elevator; Fig. 2, a detail view of the actuating-cam on the hub of the main wheel of the binder; Fig. 3, a side elevation of the same; Fig. 4, a detail view of the pinion and portion of the shaft operating the compressor and discharger; Fig. 5, a section of the same, taken on the line $x\,x$, Fig. 4; Fig. 6, a detail elevation of the slotted rack, enlarged; Fig. 7, a section of the same, taken on the line $y\,y$, Fig. 6; Fig. 8, a plan section of the binder on an enlarged scale, taken on the line $z\,z$, Fig. 1; Fig. 9, a detail elevation of a part of the trip for starting the binder; Fig. 10, a transverse section of the binder, taken on the line 5 6, Fig. 8, and looking from the rear end; Fig. 11, a detail elevation, on an enlarged scale, of the string-holder and gearing that operates the tyer; Fig. 12, a side elevation of the forward wheel of the same; Fig. 13, a section of the rear wheel, taken on the line $v\,v$, Fig. 11; Fig. 14, an elevation of a portion of the binder, looking from the outer side and representing the tying mechanism; Fig. 15, a rear elevation of the holding and cutting device; Fig. 16, a front elevation of the same; Fig. 17, a section on an enlarged scale taken on the line 1 2, Fig. 16; Fig. 18, a section of the same, taken on the line 3 4, Fig. 16; Fig. 19, a front elevation of the front plate of the holder; Fig. 20, a detail elevation of the reciprocating holder and cutter; Fig. 21, an elevation of the same reversed; Fig. 22, a detail section taken on the line $w\,w$, Fig. 14, and looking from the front end; Fig. 23, a detail section taken on the line 7 8, Fig. 8; Fig. 24, a detail section taken on the line 9 10, Fig. 23; Fig. 25, a detail longitudinal section of the tying mechanism on an enlarged scale; Fig. 26, an elevation of the tension mechanism, looking from the outer side of the machine; Fig. 27, a side elevation of one of the tension devices detached and enlarged; and Fig. 28, a section of the same, taken on the line 11 12, Fig. 27.

My invention relates to that class of machines in which string is used for the binding material; and the invention consists in certain mechanisms and combinations of devices, all of which will be hereinafter fully described, and the special improvements which are believed to be new and which I desire to secure by Letters Patent will then be pointed out definitely in the claims.

As my improvements relate wholly to the binding apparatus, I have not shown the other parts of the harvester, except a portion of the elevator-frame, which is represented by A in the drawings. It will be understood, however, that my binder may be applied to any harvester, the grain being delivered to a receiver, $a$, in the usual way.

There is a supporting-frame, A', in which the binding mechanism is mounted, and which is connected to and supported by the main and elevator frames of the machine.

The binding-arm B is attached to a rock-shaft, $b$, the front end of which is shown in Fig. 1 of the drawings, and is provided with a toothed segment, $b'$. I use the jointed binding-arm heretofore patented by me, January 20, 1880, No. 223,773.

A rack-plate, C, is provided with a longitudinal slot, $c$, by means of which it is mounted on the end of the binding-arm shaft, and at the same time is permitted to slide back and forth. This plate is provided with a rack, $c'$, offset so as to engage with the toothed segment on the binder-arm shaft, and it is connected by a rod or pitman, $c^2$, to a crank-arm, $c^3$, on a gear-wheel, C', which is arranged to engage with a gear-section on the main gear-wheel D at proper intervals to vibrate the binding-arm, as required, this vibration being effected by the reciprocation of the rack-plate, which obviously will oscillate the rock-shaft on which the binding-arm is mounted. The rim of the main wheel D is provided with an internal gear, $d$, with which an idle-pinion, $d$, is arranged to engage, the latter being driven by a pinion, D', mounted on the shaft $d^2$, which receives continuous and regular motion from the main gearing of the harvester.

A gear-wheel, E, is mounted on the rear end of a shaft, e, said shaft carrying on its forward end a pinion, E', which is arranged to engage with a gear-section on the main wheel. On the front end of the shaft, outside of the pinion E, is a crank-arm, e', the purpose of which will be hereinafter explained. The wheel E is provided on its rear face with a beveled gear section, $e^2$, with which a bevel-pinion, F, is arranged to engage, the latter being mounted on the tying-shaft f, which is arranged in an upright position, as shown in Fig. 10 of the drawings. The tying-hook F' is mounted on the upper end of this shaft, and is located underneath the outer portion of the grain-receptacle. This hook consists of an upper portion, $f^2$, which is fixed to the shaft, and is bent horizontally, as shown in Fig. 25 of the drawings, while the lower member, f'', is pivoted to the shaft, and at its outer end is formed to correspond with the end of the fixed member, so as to make a flat clamping-bill. The two faces of the clamp may be formed so as to bite closer toward the outer end than inward toward the pivot. The inner end of the pivoted member is connected by a link to a sliding rod, $f^3$, arranged in a groove lengthwise of the shaft. Near the lower end of the shaft this sliding bar is provided with a stud-pin, $f^4$, which carries a small roller, immediately below which is a cam, $F^2$, surrounding the tyer-shaft. Above the roller-pin is a loose collar, $f^5$, and a spiral spring, $f^6$, is arranged between it and the pinion above. Obviously the effect of the spring will be to press the collar down upon the pin, thereby holding the roller to the camway. The tension of the spring is regulated by making a series of notches of varying depth in the lower edge of the collar, which are adapted to receive the pin, and will of course let the collar down on the pin according to the depth of the notch. The cam $F^2$ is shaped as shown in Figs. 10 and 25 of the drawings, and it is plain that as the tyer-shaft is revolved the pin will be raised and lowered by the operation of the cam on the roller, thereby sliding the bar $f^3$ up and down to open and close the hook at the proper intervals. The closing of the hook will be effected by the action of the spring when the roller drops from the highest part of the cam.

A forked guide, G, is attached to the end of a sliding bar, g, and located over the tyer, with its forked ends pointing inward toward the machine and flaring, as shown in Fig. 8 of the drawings, in which the guide is represented in its normal position for the reception of the string. The upper end of a pivoted lever, g', is connected by a link, $g^2$, to this sliding bar g, and is provided at its lower end with a roller, $g^3$, which is acted upon by a double-inclined cam, G', fixed on the shaft e, as shown in Fig. 14 of the drawings, the cam being constructed of such form as to vibrate the lever and reciprocate the guide at the times and in the manner presently to be explained. A spring, $g^4$, is arranged between the rear guide of the sliding bar and a stop on the bar itself, which is adjusted so as to stop the bar in its normal position.

The string holder and cutter is mounted upon the upright arm of a bell-crank, H. The bell-crank is mounted on a stud attached to the frame, and in the end of its horizontal arm is provided with a curved slot, h, within which a pin, e', on the wheel E is arranged to work. The action of this pin, as the wheel E revolves, will evidently be to vibrate the bell-crank, thereby carrying the string-holder to and from the tyer to give string to the tyer while it is forming the loop. The holder is arranged outside of the tyer, as shown in Fig. 10 of the drawings, and is of peculiar construction. It is composed of a front plate, H', and a back plate, $H^2$, both of which are fastened together and secured to the carrying bell-crank, while between them is a sliding plate, I. In the front plate, at the rear end, is a slot, h', which receives a pin attached to the sliding plate I, and at the forward end is a similar slot, $h^2$, within which another pin or bolt connected to the sliding plate moves back and forth. In this connection I will explain that I use the terms "front end" and "rear end" with reference to the front and rear of the entire machine, while in speaking of the holder as a device I apply the term "front" to the part nearest to the tyer. In the lower edge of the back plate is a deep wide-mouthed notch, $h^3$, as shown in Fig. 15 of the drawings, and a similar notch, $h^4$, is similarly located in the front plate, though this notch is widened inward, also, and at its extreme inner corners is cut out slightly, as shown in Fig. 19 of the drawings. The edges of this notch in the front plate are cutting-edges, and if the plate is made of iron a thin plate of steel should be set on each side of the notch to provide proper cutting-edges.

The plate I is shaped as shown in Fig. 20 of the drawings, and at one end has a section bent over transversely upon itself, the bent portion passing over the upper edge of the front plate and down on the opposite side thereof, across the notch. At the end of this outer portion of the plate I are two prongs, i, and on the inner portion, immediately back of the former, are two prongs, i', like the first, except that they have no cutting-edges, while the outer edges of the prongs i and edges of the outside piece of the plate I are cutting-edges, and are adapted to move back and forth across the respective edges of the notch in the front plate, while the inner prongs, i', move in a similar path across the edges of the notch on the back plate as the plate I is reciprocated. The cutting portion of the plate I may be held down to its work by a bolt and nut, $i^2$; or it may be made sufficiently elastic to be held firmly to the stationary cutters. As there is more or less variation in the string used for band, it is desirable to connect the front and back plates in some way to provide for a yielding movement. This I do by using elastic washers on the fastening-bolts, though it may be accomplished in other ways.

The plate I is reciprocated by means of a bell-crank lever, J, pivoted to a suitable support on the bell-crank H, and connected at its upper end to the plate, while at its lower end it is provided with a roller, $j$, lying in contact with a cam, $j'$, attached to a gear-wheel, J', mounted on the same stud with the holder H. This gear-wheel is rotated by a pinion connected with the wheel E, and the cam $j'$ is of such shape as to give the required reciprocations to the plate I, as will be presently explained.

The string $x$ is threaded in the binding-arm, and is regulated by a tension device between the binder-arm and the spool, the spool being located on a convenient part of the machine, but not shown in the drawings. At the top of the elevator-frame is a transverse bar, on which are mounted two standards, K, bent at right angles at their upper ends, as shown in Fig. 27 of the drawings. On the top of these standards are plates $k$, at one end connected to the standards by means of a short stud, $k'$, on the inner ends of the latter, and at the other end provided with a tail-piece, $k^2$, projecting beyond the standard. A post, K', attached to the standard, passes up through the plates outside of the stud-pins, and is surrounded by a spiral spring, $k^3$, which rests upon the top of the loose plates, and is held in place by thumb-nuts $k^4$ on the upper ends of the posts, by means of which the pressure of the springs upon the plates is adjusted. The string is carried underneath the plates, which obviously will yield for this purpose, but will exert a tension on the string under the influence of the springs. Two of these tension devices are arranged upon the supporting-bar, as shown in Fig. 26 of the drawings, the string running under each of them and out through a guide, $k^5$. When but one tension device is used the twist is constantly run back toward the spool. I employ the two tension devices for the purpose of relieving the string of this extra twisting, and this is accomplished by releasing the tension on the string nearest the spool at intervals, when the twist will run out on the string between the two tension devices. The tension is then applied again at the device nearest the spool and the tension next the binding-arm released, when the twist runs out on the string toward the holder. This is effected by means of a rock-shaft, L, mounted on the standards, and provided with pins $l$, one under the tail-piece of each tension-plate, but on different sides of the rock-shaft, so that when the shaft is oscillated to bring the pin up against one of the tail-pieces to raise the tension-plate and release the string, the other plate will not be moved. The shaft is oscillated by means of a crank-arm, $l'$, attached to one end, and having a slot, $l^2$, in its lower end, in which a pin on the bent arm of a sliding bar, L', works, thereby swinging the crank-arm as the bar is reciprocated. This bar is connected at its other end to the take-up arm M, as shown in Fig. 1 of the drawings, and is surrounded by a spiral spring, which restores the take-up arm after the latter has been vibrated outward to take string from the spool. The take-up arm is provided with a small pulley, $m$, at its outer end, over which the string passes, and it is mounted on a rock-shaft, M', which extends forward to the forward end of the binder, where it is provided with a crank-arm, $m''$, which is connected by a link, $m^2$, to the upper end of a pivoted lever, $m^3$, the lower end of which is in contact with a cam, $m^4$, on the inside of the main gear-wheel, and shaped to vibrate the lever in such way as to cause the desired movements of the take-up arm, which will be hereinafter explained. The take-up arm is arranged on the machine nearly over the tyer.

At the inner or receiving side of the binder are two arms, N, bent slightly forward at their upper ends, and mounted on cranks $n$, arranged opposite to each other on a shaft, $n'$. The lower ends of these arms are connected by links $n^2$ to the lower end of a crank-arm, O, attached to a rock-shaft, $o$, extending forward along the inner side of the machine, as shown in Figs. 8 and 10 of the drawings. These arms, mounted on the cranks, are arranged to be projected up through slots in the receiver, arranged one on each side of the opening in which the binding-arm moves, and the operation of the cranks will obviously thrust them up through their slots at the inner side of the receiver, then carry them forward, and bring them down below the receiver at the forward limit of their throw, the two operating alternately. By this operation these arms act as packers, forcing the grain as it is delivered forward against the string, and then forming the bundles against a compressor, P, at the outer side of the binder. This compressor is also arranged to operate as a discharging-arm, being mounted on a crank-arm, $p$, of a shaft, $p'$. It is provided with a longitudinal slot, $p^2$, in its lower portion, through which a pin is passed, connecting it with a supporting arm or bracket, $p^3$, thus serving to guide the movement of the arm. The operating crank-shaft is moved so that the crank-arm $p$ is first thrown inward, thereby vibrating the upper end of the arm inward slightly in the direction of the left-hand arrow in Fig. 10 of the drawings. Then the shaft is reversely rotated, and the arm is moved in the direction of the right-hand arrow outward, down underneath the table, and up behind the bundle, which is then pushed off. These motions are accomplished by mounting the pinion P' at the forward end of the shaft loosely thereon, and cutting out a small section, $p^4$, as shown in Fig. 5 of the drawings. A pin, $p^5$, is attached to the shaft in such a position as to play back and forth within this aperture in the pinion, thereby permitting an oscillation of the shaft without disturbing the pinion, but locking the shaft to the pinion whenever the pin strikes one of the faces of the aperture. This pinion is held fixed in its stationary position in the usual way on the main gear-wheel, as shown in Fig. 1 of the drawings. The independent movement of the shaft is made by an arm, $p^6$, on the end of the shaft outside of the pinion, against which, at the proper time, a crank-pin, $e'$, on a pinion, $E'$, is caused to strike, the latter pinion being rotated at the proper moment by a gear-section on the main gear-wheel.

On the packing-arm shaft $n'$ is a loose pinion, $N'$, arranged to strike on the shaft and clutched thereto at will. This pinion is driven by a gear-train from the main shaft, and is moved back and forth to engage with or disengage from the shaft by means of a bell-crank lever, Q, the forked end of which embraces a collar on the pinion, and the other end of which is provided with a roller, $q$, which is acted upon by a cam, $q'$, made in one piece with the cam $m^4$, that actuates the take-up, and is attached to the inside of the main wheel.

At the forward end of the rock-shaft $o$ is a crank-arm, $o'$, which extends outward horizontally, passing through a guide, R, in which there is a vertical slot, $r$, which permits the crank-arm to move up and down. A spring, $r'$, is attached to the crank-arm, and at its lower end connected to a bracket on the guide, so that the upward movement of the crank-arm is against the tension of the spring, which may be regulated by means of a thumb-nut, $r^2$, on a rod attached to the lower end of the spring. The outer end of the crank-arm is bent at right angles to form a hook, $o^2$.

The main pinion $D'$ is loose on the main shaft, and is connected thereto by a sliding clutch, S, on the shaft in front of the pinion, which is held up in working position by means of a spring, $s$. The clutch is disengaged from the pinion by means of a holder, $S'$, one end of which is forked to embrace the clutch, the outer end being provided with a guide sliding on the shaft. On the upper side of this holder is a toggle, T, the front member, $t$, of which is pivoted at its forward end to the clutch-holder, while the rear member, $t'$, carries upon its outer end a roller, $t^2$, on an upright stud. These two members are jointed together near the center of the holder, and just over the joint is a pin, $t^3$, extending horizontally inward just over the hook $o^2$ on the end of the crank-arm $o'$, as shown in Figs. 8 and 24 of the drawings. This hook is held in a slotted guide, $o^3$, attached to the clutch-holder. Now, when the toggle lies flat upon the holder it is the same as a stiff bar, and when pushed outward will of course carry the holder and clutch with it. This is accomplished by means of a cam, $u$, on the outer face of the main wheel, the inclined face of which is brought in contact with the roller on the end of the toggle at each revolution of the wheel, gradually pushing back the toggle and holder until the clutch is disengaged, when of course the main wheel and all parts driven thereby are stopped. If, however, the toggle is broken under the force of the spring, the clutch will immediately engage with the pinion and again start the binding mechanism. This is effected by the lifting of the pin $t^3$ by raising up the hook underneath it, and the latter movement is effected by the rocking upward of the shaft $o$ by the action of the packing-arms, for obviously as the grain accumulates to form the bundle in front of the packers their upper ends will be limited in their forward movement, which will tend to pull forward their lower ends, bringing with them the arm O on the rock-shaft, thereby lifting the pin of the toggle until finally the latter is broken and the clutch tripped automatically, so as to set the binding mechanism into operation.

A string or band placer, V, is arranged in front of the tyer. It is in the form of a shaft with its rear end bent twice at right angles, forming a crank-arm, $v$, and the straight shaft portion is set in suitable bearings at an angle to the reciprocating movement of the string-guide, as shown in Fig. 8 of the drawings. A spring, $v'$, is wound around the shaft, which acts to hold the bent arm down in the horizontal position shown in the above-mentioned figure of the drawings. On the forward end of this shaft is a simple crank-arm, $v^2$, which is connected by a link-rod, $w$, to a lever, W, hinged at one end to the frame and lying over the shaft which drives the tyer. On this shaft is a pin, $w'$, which at the proper moment comes in contact with the lever W, thereby raising it and throwing up the bent arm to push the string up within reach of the tyer. On account of the inclined position of the straight portion of this device, when the bent arm is thrown down, as shown in Fig. 8 of the drawings, it lies outside of the plane of the string, but when raised it is thrown inward under and against the string to carry it into proper position for tying the knot.

Some of the devices above described may be changed in construction and arrangement, and in some instances other well-known devices substituted without changing the operation of the machine, and therefore I do not wish to be understood as limiting my invention in all particulars to the devices herein shown and described, provided always that modifications of the mechanism do not radically change the operation.

The practical operation of the mechanism here shown and described is as follows: The string is carried through the tension devices, over the take-up, and over a sheave on a support above the binding-arm to the binding-head, through which it is threaded, as shown in Fig. 1 of the drawings, thence downward between the forked guide and underneath the bill of the tyer to the holder, as shown in Fig. 10 of the drawings. To properly secure the string in the holder, ready for work, it is necessary to put the machine through one motion without binding. The movable cutter and holder will be at either one extreme or the other of its stroke, the cam which operates the cutter being so timed that it makes a half-revolution and moves the cutter in one direction only for each bundle, the cutter being left at the end of its stroke on one side or the other of the notches in the plates when the binder is tripped. The end of the string is held in any position, and when the machine is set in motion the binding-arm descends and places the string within the notches in the holding-plates. As the movement continues the forked cutter and holder is reciprocated and the back fork catches the strand between the tyer and holder, and immediately thereafter the front or cutting fork catches the same strand and severs it in front. It will thus be seen that the cord is clamped and cut and the end held, and the binding-arm, now returning, draws the string back through the notches in the plates and between the forks of the movable cutter and holder, after which the reciprocation of the latter is continued until it reaches the limit of its throw and clears the notches, this position being shown in Figs. 16 and 18 of the drawings. The binder is now ready for work. The grain is delivered to the receiver. The packing-arms operate to form the bundle against the string and compressor-arm in the position shown in Fig. 10 of the drawings. When the bundle has reached a certain size the trip-toggle is released, as described above, and immediately the binding mechanism is put in operation, and the first movement is to vibrate the binding-arm downward, thereby placing the string around the bundle and within the holder, as already described. At this moment the forked guide is reciprocated toward the front end of the machine to bring both strands within reach of the placer and tyer. The two strands now lie together under the bill of the tyer, and immediately the placer is thrown up, thereby bringing the strands close together at the bundle. At this point the tyer begins to revolve, which forms a loop in the two strands in a well-known way. The band-holder vibrates forward during this movement to give string. The tyer makes a single revolution, and the forked guide is then reciprocated toward the rear end of the machine, thereby shedding the loop from the tyer; but at the same time the forked cutter and holder has been reciprocated, thereby grasping the cord, cutting off the band portion between the holder and tyer, and releasing the strand previously held between one of the prongs and the other side of the notches in the holding-plates. Thus the string is caught and cut on the opposite side of the notches in the plates from which it was held before, and is released from its old clamp at about the instant of cutting. As the binding-arm descends to place the band around the bundle the take-up arm is vibrated inward to give string for the band; and if more is required than is given up by the take-up it is drawn directly from the supply. While the tying is going on the take-up arm is vibrated outward again, thereby drawing a supply of string from the spool. This vibration of the take-up arm operates the tension devices alternately, as already described, to relieve the string from accumulated twist. At the commencement of the rotation of the tyer the compressor-arm is thrown inward, as described above, thereby making an extra compression of the bundle during the operation of tying to relieve the string from strain. In the meantime the binding-arm has made its upward stroke at the proper moment to leave the string between the forks of the holder, as stated above. The compressor-arm is now moved in the opposite direction, (its inward movement being momentary while the pin passes the crank-arm, as described above,) and is brought up behind the bundle, which it then discharges, and stops. During these operations the packer-arms have been idle, the pinion-clutch being released by the mechanism already described; but during the latter part of the movement of the compressor-arm they are thrown into operation again, and at about the same time the main gear-wheel completes its revolution, thereby disengaging the clutch on the main pinion-shaft, and the binder rests. The operation described above is then repeated.

In the above description of the operation of my improvements I have stated that the bundle is formed against the string and compressor-arm. In some machines heretofore used, however, the bundle has been formed against the band material alone, the bundle being gathered and formed by the binding-arm in the act of closing. Now, obviously in the application of my improvements to this class of machines the compressor-arm or any other separate stop may be dispensed with, and the bundle formed by the packers acting against the string alone, for a greater strain will not be put upon the string in this instance than in the operation referred to above.

In this application I do not claim the following improvements as part of my present invention, as they constitute the subject-matter of another and separate application for Letters Patent: first, the arm or arms for packing or compressing the grain into the gavel-receptacle, having connected therewith suitable means or devices for actuating the trip mechanism of the binder to start the latter whenever sufficient grain has been packed into the receptacle to form a sheaf; second, a yielding packer or packers, in combination with an adjustable tension device to regulate the size of the bundles; third, the packer-arms mounted on a crank-shaft, in combination with mechanism whereby the packer-arms are automatically thrown out of motion while the bundle is bound.

Having thus described my invention, what I claim as new, and desire to secure by Letters Patent, is—

1. A combined bundle compressor and discharger, in combination with mechanism whereby the compressor and discharger is first moved forward to compress the bundle during the operation of tying, and is then carried below and back of and discharges the bundle, substantially as described.

2. The compressor-arm P, in combination with a shaft provided with a crank on which the compressor is mounted, the pinion P', cut out on one side of the shaft, and the pin $p^5$ on the shaft, substantially as and for the purpose set forth.

3. The crank-shaft $p'$, in combination with the compressor P, pinion P', cut away, as described, arm $p^6$ on the end of the shaft, and pinion E', provided with a crank-pin, $e'$, substantially as and for the purpose set forth.

4. An elastic gathering and packing arm or arms, in combination with a tripping mechanism connected therewith, and a suitable resistant, against which the bundle is formed by the packers, whereby the yielding of the said gathering and packing mechanism under the accumulation of grain to form the bundle will operate the trip and automatically set the binding mechanism in motion, substantially as described.

5. The packer-arms N, mounted on cranks $n$, in combination with the rock-shaft $o$, to which the lower ends of the packer-arms are connected for operating the trip, substantially as described.

6. The packer arm or arms, in combination with a rock-shaft, a trip mechanism arranged to be operated by the oscillation of the rock-shaft, and a link or links connecting the packer arm or arms to the rock-shaft, whereby the yielding of the packer-arms to the resistance of the grain as it is packed into the receptacle will rock the shaft to operate the trip, substantially as described.

7. The packer-arms N, in combination with the rock-shaft $o$, provided with crank-arms O and $o'$, the clutch on the main pinion-shaft, and the trip-toggle on the clutch, substantially as described.

8. The rock-shaft $o$, provided with the crank-arm $o'$, in combination with the slotted guide R and spring $r'$, and packing-arms connected to the rock-shaft, whereby elasticity is given to the packer-arms and rock-shaft, substantially as described.

9. The packer-arms N, in combination with the crank-shaft $n'$, loose pinion N', provided with a clutch to connect with the shaft, the crank-lever Q, and revolving cam $q'$, substantially as described.

10. The compressor-arm P, in combination with the yielding packer-arms N, and mechanism which holds the compressor in a fixed position while the bundle is gathered and formed, substantially as described.

11. The spring-clutch S, in combination with the sliding holder S', both mounted on the main shaft, the toggle T, mounted on and carried by the said holder, and the cam U on the main gear-wheel, substantially as described.

12. The spring-clutch S, in combination with the toggle T, provided with the pin $t^3$, cam $u$, hooked crank-arm $o'$, rock-shaft $o$, and packer-arms N, substantially as described.

13. In a grain-binder, a string-holder composed of two plates, notched as described, in combination with a reciprocating plate arranged between the former, and provided with two sets of prongs—one set between the plates and the other set outside of the front plate—the latter being provided with cutting-edges, the whole arranged and operating to seize and cut the string and hold the end on one side of the plate-openings and release the band end on the other side by the reciprocation of the middle plate in one direction only, substantially as described.

14. The front plate, H', in combination with the back plate, $H^2$, which are provided with recesses $h^4 h^3$, respectively, the one in the front plate being wider than that in the back plate, and the sliding plate I, provided with prongs $i i'$, and cutting-edges on the former, substantially as and for the purpose set forth.

15. A string-holder, and the bell-crank lever H, on which it is mounted, in combination with the wheel E, provided with a pin working in a slot in the end of the crank-arm, whereby the holder is moved to and from the tyer, substantially as and for the purpose set forth.

16. The sliding rod connected to the pivoted member of the tyer and provided with pin $f^4$, in combination with the spring $f^6$ and adjustable collar $f^5$, with a series of notches varying in depth, whereby the tension of the spring may be adjusted, substantially as described.

17. A rotating tying-hook, in combination with a reciprocating string-guide arranged to stand with its opening at one side of the hook to receive the string while the hook is at rest, and mechanism whereby the guide is first moved slightly toward and over the hook just before the latter begins to rotate, in which position it is held while the loop is formed, then is moved away from the hook to strip the loop, and then is moved back to its first position of rest, substantially as and for the purposes set forth.

18. The rotary tyer, in combination with the reciprocating forked guide G, lever $g'$, and rotating cam G', substantially as described.

19. The rotating tyer, in combination with the reciprocating forked guide and the vibrating band-placer, arranged and operating substantially as described.

20. The rocking band-placer V, bent substantially as specified, and having its shaft inclined horizontally to the plane of movement of the binding-arm, in combination with mechanism whereby the shaft is rocked to place the band, substantially as and for the purposes set forth.

21. The rocking band-placer V, bent substantially as specified, and having its shaft inclined horizontally to the plane of movement of the binding-arm, in combination with the spring $v'$, lever W, connected to a crank-arm on the placer-shaft, and pin $w'$ on a rotating shaft, whereby the placer is operated, substantially as described.

22. The take-up M, in combination with the rock-shaft M', provided with the crank-arm $m'$, pivoted lever $m^3$, and cam $m^4$, substantially as described.

23. The spring tension-plates $k^2$, in combination with a rock-shaft, L, provided with pins $l$, arranged on different sides of the rock-shaft, and mechanism for oscillating said shaft, and arranged to operate to release the tension next the spool first, and then the tension next the binding-arm, substantially as and for the purpose set forth.

24. The spring tension-plates, in combination with the rock-shaft provided with pins, as described, and a slotted crank-arm, $l'$, and take-up arm M and connecting-bar L, substantially as described.

25. The take-up M, in combination with the two separate tension devices $k$ $k^2$, and mechanism arranged to release the tension devices alternately, substantially as and for the purpose set forth.

DANIEL STRUNK.

Witnesses:
JNO. C. MACGREGOR,
M. B. GAGE.